United States Patent [19]

Grotberg

[11] 4,101,244
[45] Jul. 18, 1978

[54] VERTICAL AXLE PADDLE MOTOR

[76] Inventor: Robert B. Grotberg, Kathryn, N. Dak. 58089

[21] Appl. No.: 739,263

[22] Filed: Nov. 5, 1976

[51] Int. Cl.² .................................................. F03D 7/06
[52] U.S. Cl. ...................................... 416/41; 416/119; 416/17
[58] Field of Search ...................... 416/41, 42, 48, 111, 416/119, 158, 17

[56] References Cited

U.S. PATENT DOCUMENTS

| | | | |
|---|---|---|---|
| 965,387 | 7/1910 | Hawxhurst | 416/48 |
| 1,180,085 | 4/1916 | Stirtan | 416/50 |
| 1,416,052 | 5/1922 | Nolan | 416/17 |
| 1,791,731 | 2/1931 | Madarasz | 416/41 X |
| 3,902,072 | 8/1975 | Quinn | 416/111 X |
| 4,003,676 | 1/1977 | Sweeney et al. | 416/48 X |

FOREIGN PATENT DOCUMENTS

| | | | |
|---|---|---|---|
| 586,270 | 3/1925 | France | 416/117 |
| 915,892 | 11/1946 | France | 416/111 |
| 23,639 | 12/1921 | France | 416/117 |

*Primary Examiner*—Everette A. Powell, Jr.

*Attorney, Agent, or Firm*—Schroeder, Siegfried, Ryan, Vidas & Steffey

[57] ABSTRACT

A vertical axle paddle motor including a support structure with a rotor mounted on the vertical axle, the rotor having a plurality of arms with paddle members pivotally attached to the end of the same. Each of the paddle members include a plurality of adjustable vanes which move from an open to a closed position within the paddle. Vane position in the paddles is controlled by a wind velocity and wind direction control, operating a pair of cams forming a composite cam surface which is engaged by cam followers on each of the rotor arms associated separately with motors on the paddle, to adjust the position of the vanes within the paddles for maximum efficiency in rotation. The wind velocity cam may be adjusted relative to the wind direction cam to increase the amount of time the vanes of the paddles are held in an open position to reduce and stabilize rotation of the rotor. The wind velocity cam may also be adjusted by a separate motor means to prevent any of the vanes from moving to a closed position causing cessation of rotor rotation.

23 Claims, 15 Drawing Figures

VERTICAL AXLE PADDLE MOTOR

This invention relates to a vertical axle paddle motor and more particularly to an improved wind driven vertical axle paddle motor providing a rotative power output for driving a mill or power generating equipment.

Wind motors or paddle type windmills of the vertical axle type are known in the art and have been applied to the operation of mills and in the generation of electric power. These prior constructions have utilized vertical axle units with rotor arms thereon in which the vanes are freely pivoted and distributed along the extend of the rotor arms. Such constructions rely on stop structures associated with the rotor arms to hold the vanes in a fixed position with respect to the rotor arms as they come into and face the wind to be moved thereby while being allowed to freely pivot as the vanes are being moved upwind. This type of construction eliminates the need for positive positioning the vanes in the upwind direction for movement, but present ineffective and varying surface areas to the force of the wind in the rotation of the rotor. Speed control of such units have been effected by adjustably positioning the fixed stops in accord with rotor rotation to permit sequential feathering or release of the vanes in the face of the wind to reduce the speed of rotor rotation. Still other designs of equipment of this type have employed pivoted vane members suspended from the ends of the rotor arm. These require positive positioning of the vanes with rotor movement to position the vanes so that they may collect the air movement in the downwind direction and move to a streamline position in an upwind direction. Such positioning has been effected by special camming surfaces mounted on the end of the rotor arms but provision for speed control is unavailable for such designs. Still other designs have utilized special camming and linkage functions for shifting the vane positions with rotor rotation and for reducing the amount of vane surface area to the wind for speed control, but without the provision of adjusting the vanes in accord with wind direction.

The present invention is directed to an improved vertical axle wind motor of the type in which the rotor employs a plurality of rotor arms, each having paddle members formed of a plurality of vanes at the ends of the same. Such a paddle arrangement provides the maximum of effective surface to the wind direction for increased efficiency in rotation for such a wind motor. In addition, the individual vanes making up the paddles are adjusted between an open and closed position in accord with wind direction and wind velocity through a motor means mounted on each paddle. This provides the maximum effective surface for rotor rotation and a reduced surface for rotor speed control in the automatic operation of a paddle motor of this type. This improved vertical axis paddle motor incorporates separate camming mechanisms driven from a wind velocity sensor and a wind direction sensor to provide a composite cam surface to cam followers controlling the supply of hydraulic fluid to hydraulic motors for positioning the vanes within the paddles of the motor. An improved vane construction, as well as the wind direction and velocity sensors, incorporate a fiberglass covering on a metal frame to provide a lightweight durable construction in a motor of this type. The wind motor also includes a motor operated stop means for feathering all of the vanes in all of the paddles to prevent rotation of the motor when it is desired to shut the same down. The improved design includes a metal frame construction for an in-place installation which is adjustable for any wind position or direction and for varying wind velocities to provide for an automatic operation of the motor of this type.

It is therefore an object of this invention to provide an improved vertical axle paddle motor of the wind driven type.

Another object of this invention is to provide in a vertical axle paddle motor a positive positioning of vanes by a motor drive for efficient control of the same.

Another object of this invention is to provide an improved vertical axle paddle motor of this type in which vane positioning during rotation is adjusted for maximum drive in the wind direction.

Another object of this invention is to provide in a vertical axle paddle motor an improved arrangement of positioning of the vanes in the paddles in accord with wind direction and wind velocity.

Another object of this invention is to provide in a vertical axle paddle motor of this type a motor driven stop means.

A still further object of this invention is to provide in a vertical axle paddle motor of this type an arrangement in which all vanes in the paddles of the motor are simultaneously moved to varying operating positions.

A still further object of this invention is to provide a wind motor of this type capable of powering large electric power generators.

these and other objects of the invention will become apparent from the reading of the attached description together with the drawings wherein.

Figures 1, 4:
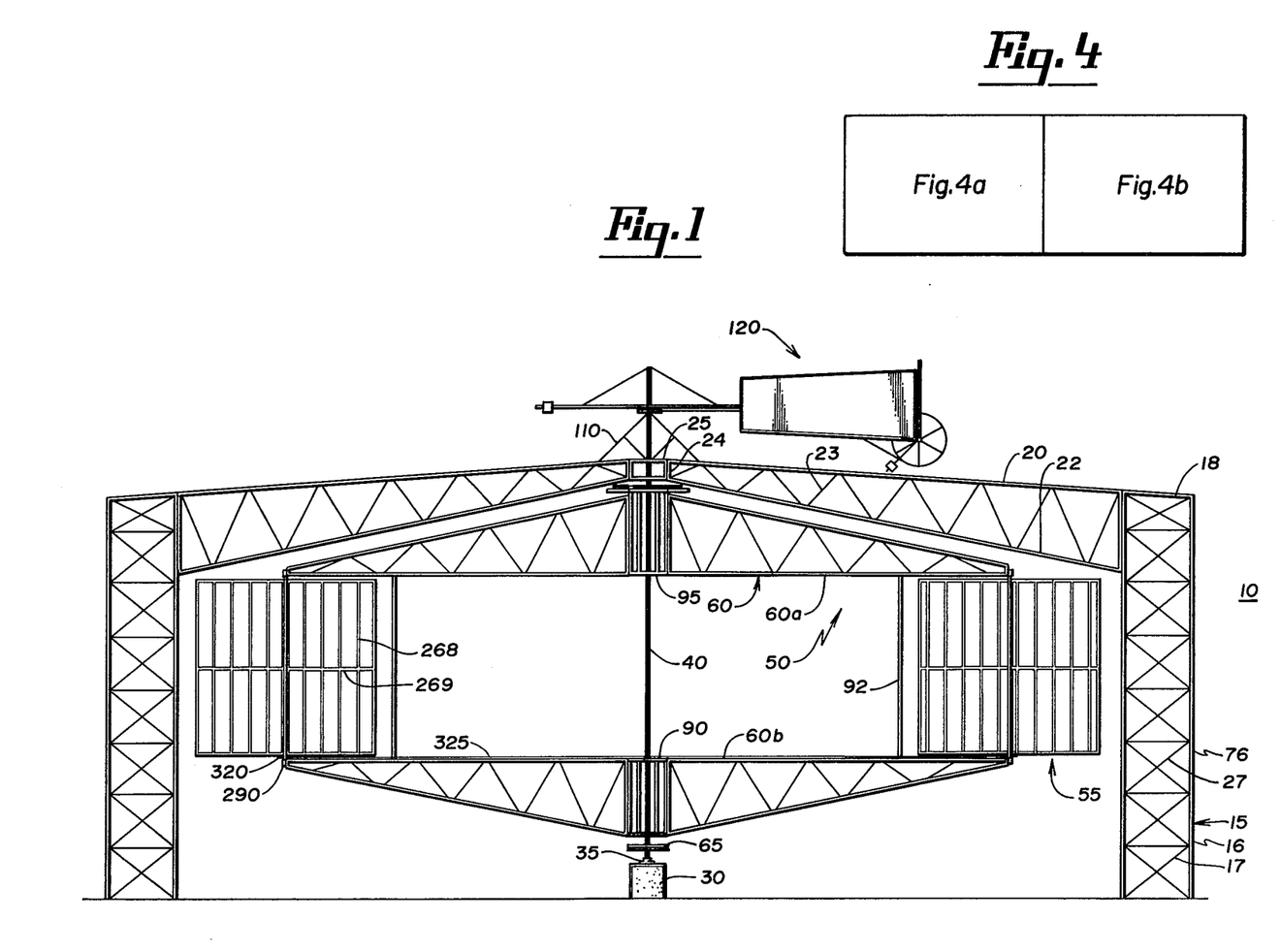
FIG. 1 is an elevation view of the improved vertical axle paddle motor with parts removed.
Figure 2:
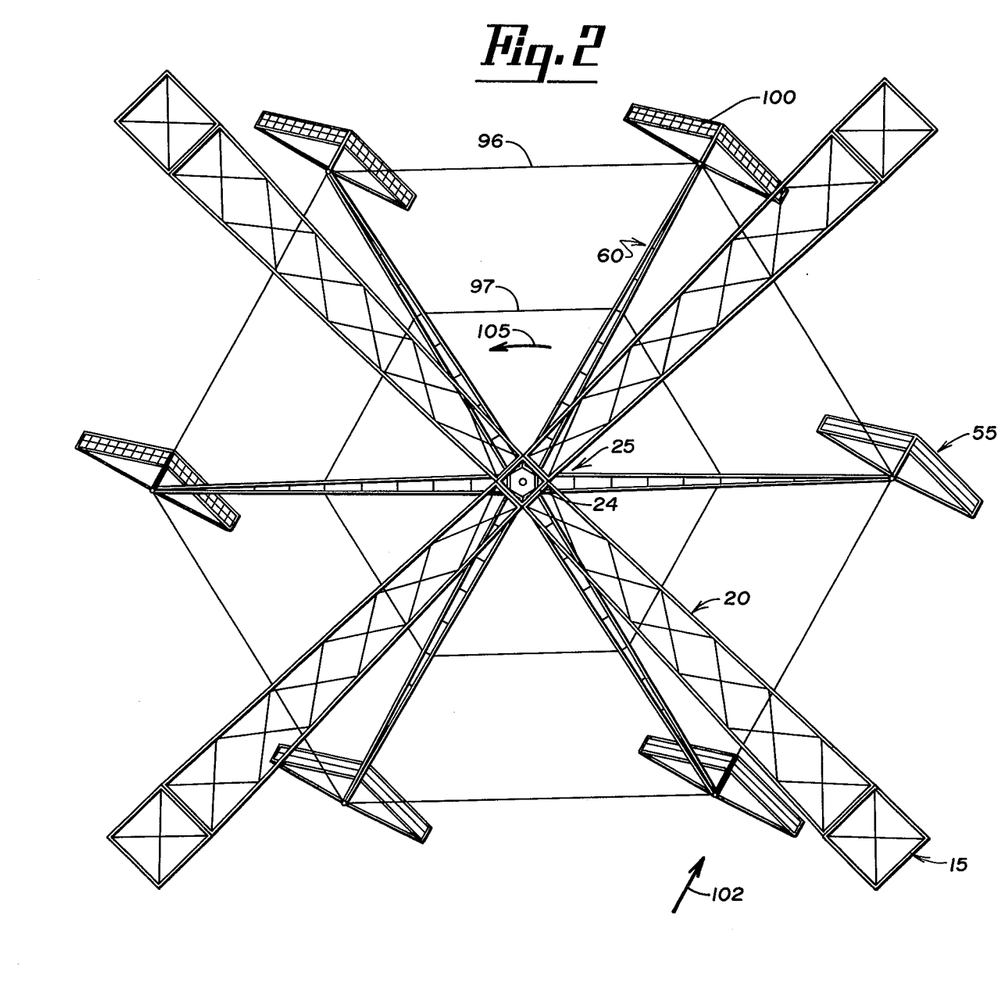
FIG. 2 is a top view of the vertical axle paddle motor with parts removed.

The wind driven vertical axle paddle motor of the subject invention is shown in FIGS. 1 and 2 as supported on and positioned within an upstanding frame structure indicated generally at 10. As shown in FIGS. 1 and 2, the frame structure includes a plurality of support towers 15, four of which are shown, each of which mount transversely extending beam-like support frames 20 which frames are interconnected by means of a frame-like interconnecting member 25. The individual support towers are preferably formed of four elongated spaced metal tubing members 16 which are interconnected by suitable cross bracing 17 and cross frame pieces 18 to define tower-like structures which are adapted to be rigidly positioned into or on a ground surface for supporting the paddle motor. The support beams 20 are formed of suitable elongated tubing members 22 which are connected together at their extremities by cross bracing 24 with suitable interconnecting supports 23 extending along the extent of the same and defining a generally tapered beam-like structure. The support beams are attached to the towers 15 through suitable means such as welding or bolts (not shown), and their opposite extremities are interconnected in a generally cruciformed configuration to the connecting frame member 25, also made of suitable tubing with appropriate cross bracing, to define a generally box-like structure to which the ends of the support beams are suitably connected, such as welding or bolts (not shown). The four towers are positioned on a ground surfaced or suitably secured thereon and connected to the cross beam or support frames 20 to define a generally square or table-like support structure with the support frames interconnecting diagonally disposed towers and the connecting support 25 at the geometric center of the same. Directly below the geometric center of the member 25 is a suitable lower bearing support, indicated at 30, which is a concrete base with a suitable journaled bearing 35 mounted on the same. A suitable support axle or vertical axle 40 is journaled at one end on the bearing 35 of the block 30 with its other extremity journaled in the upstanding frame at the connecting member 25, as will hereinafter be noted. The axle mounts a rotor member, indicated generally at 50, with suitable paddles 55 mounted at the ends of rotor arms, indicated generally at 60. The rotor arms are connected to a central frame mounted on the vertical axle to rotate within the upstanding frame structure defined by the towers 15 and cantilever type support frames 20 interconnected by the frame member 25. Also mounted on the vertical axle 40 above the support bearing 35 is a pulley 65 which is connected through suitable cabling 70 to a gearing indicated schematically at 75. The latter drives a power plant or generator 80 having a suitable regulating equipment 85 connected thereto. Such equipment is shown schematically since the details of the same form no part of the present invention and interconnection between the drive axle and the details of the driven structure may take varying forms.

As will be seen in FIG. 2 the present disclosure utilizes four support towers in the upright frame structure for the paddle motor with the rotor having six support arms each carrying at the ends of the same a paddle which is pivotally mounted thereon. It will be understood, however, that the number of arms and paddles together with a number of support towers or the particular configuration of the upstanding frame structure may vary within the scope of the present invention. Further, as will be seen in FIG. 1, each rotor arm 60 is actually formed of an upper and lower support frame part, 60a and 60b, which are spaced apart a distance to support and journal the paddle frame therebetween.

The lower frame parts 60b forming the lower half of the rotor arms are interconnected with a hexagonally shaped frame structure 90 to which the ends of the lower frame parts are bolted or otherwise suitably connected with the center of the frame structure 90 being mounted on the vertical axle 40. The upper frame parts 60a are similarly connected to an upper hexagonally shaped frame part 95 which is mounted on the vertical axle 40 and interconnected to the upper frame parts through suitable means, such as welding or bolts (not shown). Suitable vertical braces 92 extend between the upper and lower frame parts 60a and 60b of the rotor arms and tie cabling 96, 97 extends between the extremities of the upper and lower arms and midway along their extent to interconnect the arms and maintain the same in the same spaced relationship on the vertical axle.

The individual paddles 55 have a plurality of vertically positioned vanes 100 therein which extend the height of the paddle between the rotor arms and within a frame, to be later defined, housing the paddle which may be pivoted between an open and closed position. As will be seen in FIG. 2, the open position is defined in which the extent of the vanes are parallel with the side edges of the paddle frame and in the closed position, define a parallel relationship with the extent of the paddle frames. The frame parts of the rotor arms and the interconnecting frames 90 and 95 are each formed individually of metal rod-like members, with suitable interconnecting bracing similar to the support tower and cross frame to apply a minimum of resistance to the rotation of the rotor under the influence of the wind. The paddles pivotally mounted on the ends of the rotor arms and between the upper and lower sections of the same are the only structure capable of presenting open and closed surfaces the air currents for maximum efficiency and rotation of the rotor. As will be seen in FIG. 2, the paddles on the ends of the rotor arms are constructed to be generally dish-shaped or concave and when the vanes therein are closed, will provide a generally dish surface in which the wind will impinge to apply force to the rotor causing rotation of the same. In FIG. 2, the direction of a prevailing wind for purposes of explanation is shown at 102 with the direction of the rotor being indicated generally at the arrow 105. Thus, as will be hereinafter noted, the wind direction and velocity control will adjust the position of the vanes 100 within the paddles 55 to either present a maximum effect collecting surface for the wind in the downwind movement of the paddles on the rotor arms and an open or feathered position of the vanes in upwind travel of the paddles.

Positioned on top of the upstanding frame through knee-like support frame members 110, is a wind velocity and direction control, indicated generally at 120, which is coupled to the rotor 50 in a manner to be hereinafter identified.

The wind direction and velocity control 120 will best be seen in FIGS. 3, 4a, 4b, and 5. It includes a generally beam-like structure formed on a frame having two spaced elongated rod members 125 which are suitably interconnected by cross bracing 126 and mount a shaft 128 through a suitable hub member 130 positioned between the rod-like member 125. At one end of the rod-like members is a counter balance weight 132 which may be adjusted along the extent of the same for counterbalancing the mass at the opposite ends of the elongated member. Extending from the opposite ends of the elongated members are a pair of generally rectangular frames 135 which are suitably connected to the elongated members. The frames 135 are covered by a suitable covering material 138 forming a pair of spaced panels attached along the extent of the rod members 125 and secured thereto. These define the vane for the wind direction sensor which rotates the members 125 with the vanes thereon and the interconnected shaft 128 through the hub 130 on a suitable bearings, to be hereinafter defined, attached to the upstanding frame or knee-like structure 110, connected to the cross support members of the upstanding frame. Shaft 128 is journaled in a suitable bearing 133 in the hub 140 and the upper end of the shaft has guide wires 145 connected to the elongated support members or rods 125.

Figure 3:
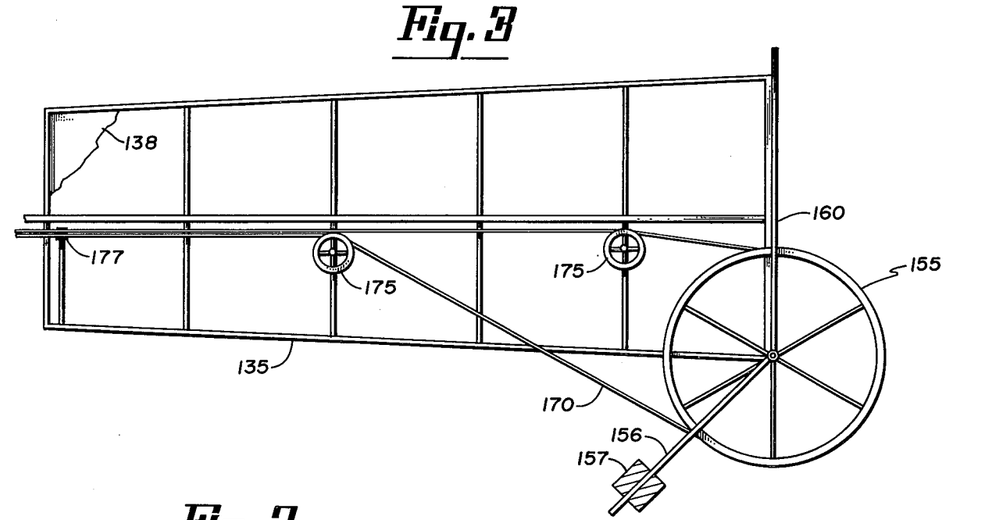
FIG. 3 is an elevation view of the wind direction and velocity sensor of the vertical axle paddle motor with parts broken away.
Figure 4A:
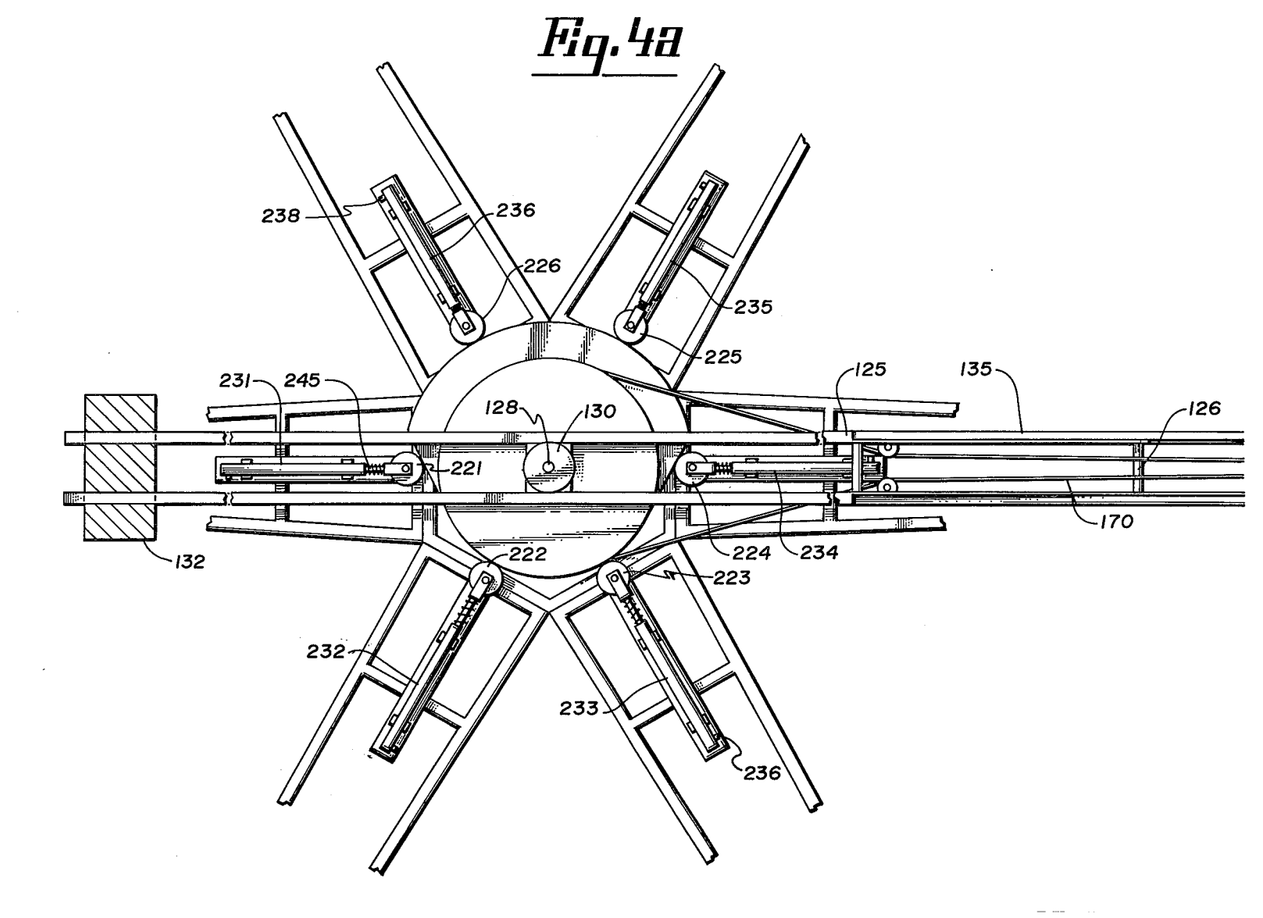
FIGS. 4(a) and 4(b) are top views of the wind direction and velocity structure of FIG. 3 and including a portion of the control operated thereby.
Figure 4B:
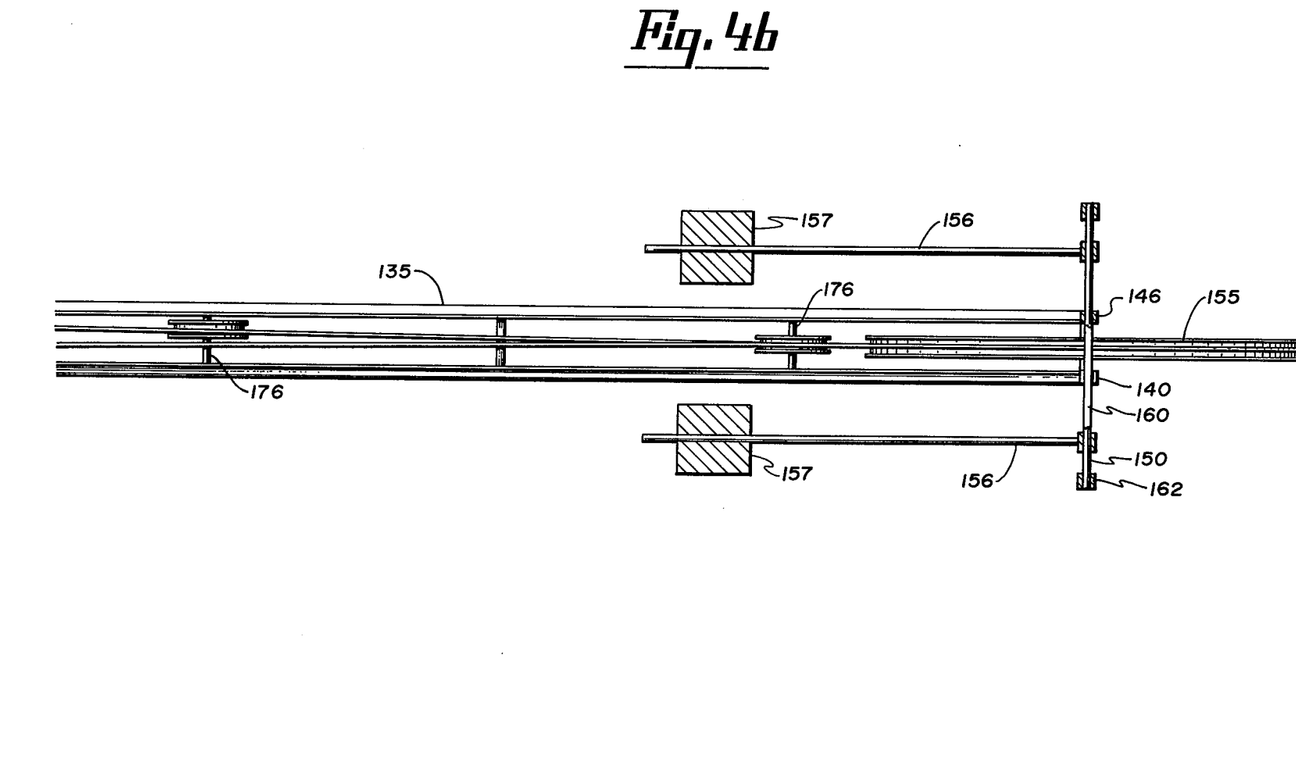

As will be best seen in FIGS. 3 and 4b, the lower end of the support frame 135 of the panels for the wind direction sensor mount suitable bearing members 146 to support a shaft 150 therein which shaft extends beyond the ends of the frames 135. Mounted on the shaft and between the frames 135 is a grooved wheel or pulley 155 and spaced therefrom on the shaft 150 are counterbalance arms 156 carrying adjustable counter weights 157 at the ends of the same. Between the counterbalance arms which are keyed to the shaft 150 are positioned a pair of elongated panel members 160 which extend from the shaft vertically upward and translationally against the ends of the panels 135. This may be a single panel which is notched to clear the pulley wheel 155. The panel or panels have a width substantially equal to the spacing between the elongated counterbalance arms on the shaft 150. These panels form surfaces which are impinged on by the wind. When the wind is of a sufficient force, it overcomes the rotative force of the counterweight arms on the shaft 150 will cause rotation of the wheel 155 in a clockwise direction moving the panels 160 away from the ends of the wind direction panels 135. The magnitude of such wind will determine the amount of tilt of the panels 160 or rotation of the wheel which is transmitted by means of a cable 170 positioned over pulley members 175 mounted on suitable pivot arms 176 positioned between the panels 135 and through guide pulleys 177 to a pulley wheel 180 mounted concentric with the shaft 128. The pulley wheel has attached thereto the hub 140 supporting a bearing 133 for the shaft 128. It is supported in a suitable bearing 185 mounted in the bearing support holder 186 on the ends of the knee-like support frame 110. An outer concentric shaft 190 is journaled in the bearing 185 and connected to the pulley 180 to rotate therewith and support an extension of the shaft 128 within the same.

Figure 5:
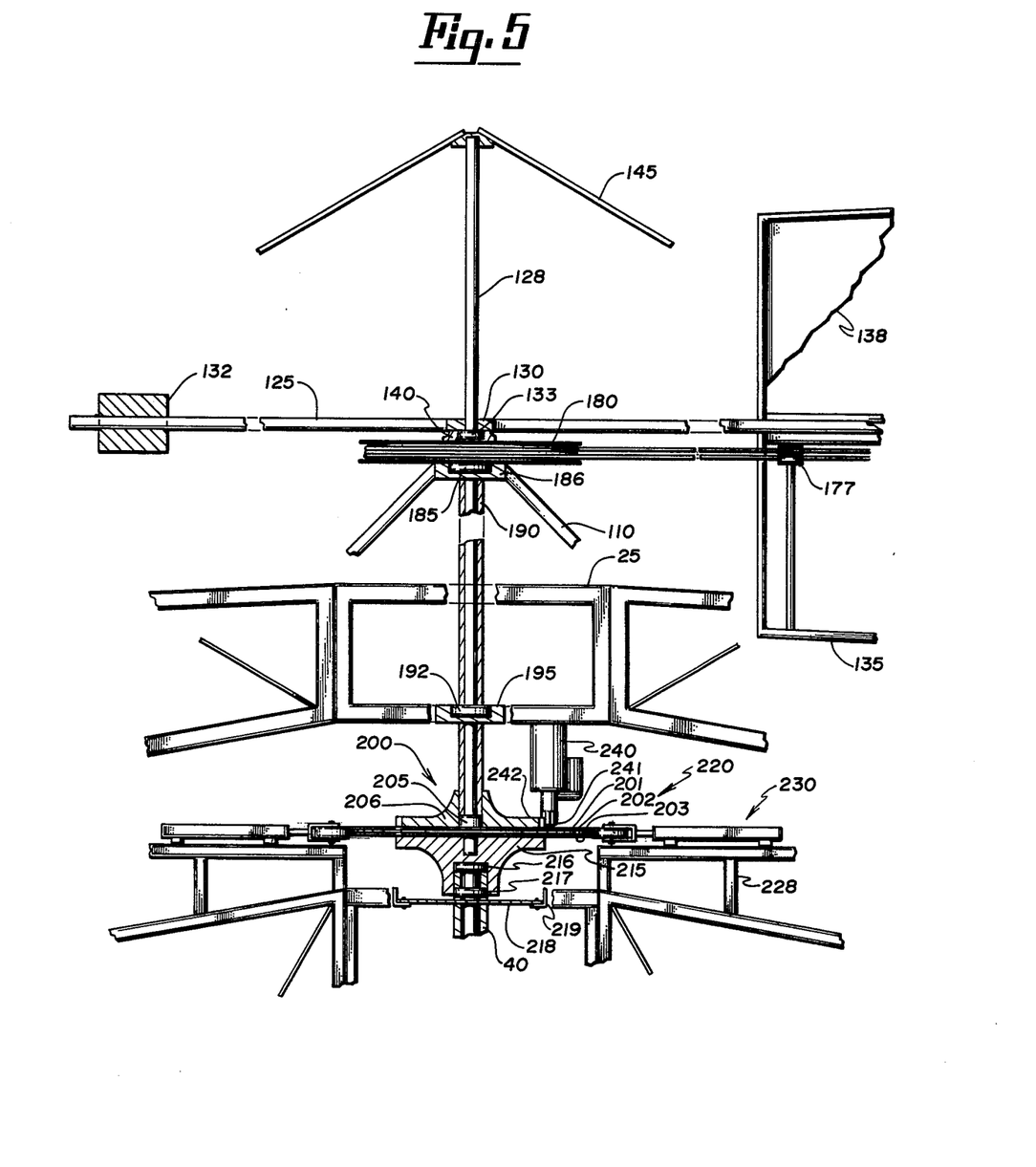
FIG. 5 is an elevation view of a portion of the wind velocity and direction sensors and control with parts broken away.
Figure 6:
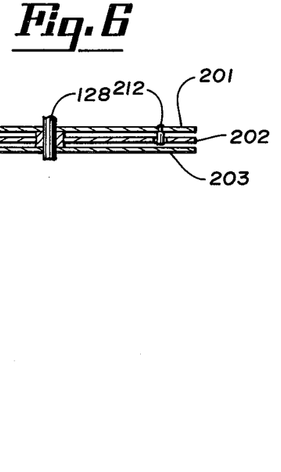
FIG. 6 is an sectional view of the cams of the wind velocity and direction control.

As will be seen in FIG. 5, the shaft 190 with the shaft 128 therein is journaled through a suitable bearing 192 in a bearing support 195 connected in the connecting frame part 25 of the upstanding frame. It extends through the upstanding frame to the rotor 50. With this arrangement of parts, the wind velocity sensor is carried by the wind direction sensor and both are supported in the upstanding frame or the support frames 20 thereof through the shafts 128 and 190 which transmits the control signals therefrom. The wind direction control or the vane which is coupled to the shaft 128 pivots on the upstanding frame to transmit motion through shaft 128 in accord with positioning of the vanes supported on the rod-like members 125 forming the weather vane of the wind direction indicator. The panels 160 of the wind velocity indicator are carried thereby being supported on the shaft 150 journaled on the panels 135. This assembly is held in assembled relationship by caps 162 positioned on the ends of the shaft 150 to retain the counterbalance arms, panels and drive wheel 150 or pulley in assembled relationship. Rotation of the wind velocity panel will transmit rotation through the pulley 180 to the outer concentric shaft 190 providing a wind velocity signal to the control which will be best seen in FIGS. 4–7. This control is formed of a composite cam structure, indicated generally at 200 which is driven by the shafts 190 and 128 which has associated therewith a plurality of cam followers indicated generally at 220 operating pumps, indicated generally at 230. In FIGS. 4a, 5 and 6, the composite cam structure is shown to include cams 201, 202, and 203 in a stacked relationship which are located below the supporting frame members 20 and the connecting frame member 25 and are carried by the shafts 128 and 190 in the following manner. Shaft 190 mounts a hub member 205 which is keyed thereto. The hub member 205 includes a bearing 206 for the inner shaft 128. The hub member 205 is secured to the cam 201 through suitable screw means extending through apertures 207 in the cam. A central aperture 208 permits the passage of shaft 128 therethrough. Cam 202 positioned beneath the same in a stacked relationship floats freely on the shaft 128 through a bearing 209 and this cam has a curved slot 211 therein which cooperates with a pin 212 carried by the cam 201. The cam 203 which is positioned beneath the cam 202 in the stacked relationship (see FIG. 6), has a plurality of mounting apertures 212 therethrough with a central aperture 213 through which the shaft 128 extends. A suitable bearing hub 215 is attached to the cam 203 through suitable screw members (not shown) and is also staked to the end of the shaft 128 such that it moves with the cam 203. Hub 215 carries a suitable support bearing 216 for a shaft end 217 for the vertical axle 40 of the rotor, the axle being formed of an internal shaft member 217 with a tubular sleeve 40 over the same by means of which the frame parts are connected to the axle. In FIG. 5, it will be seen that a suitable transversely extending plate 218 is attached to sleeve 40 of the axle, such as by welding, and suitable flanges 219 on the plate 218 are secured to the ends of the upper rotor arms 60a or the connecting frame part 95 to secure the axle to the upper frame arms at this point and support the rotor frame on the axle.

Associated with the composite cam structure 200 formed of the cams 201 – 203, are the cam followers and associated pumps 220, 230 respectively which are mounted on the upper arm frames of the rotor frame. As will be seen in FIG. 4a, there are six cam followers, 221 – 226 having roller extremities engaging the peripheral edge surface of all three cams which provide the composite cam surface to be followed by the cam followers. Each of the cam followers has a shaft fitting into associated pumps in the form of ram type actuators 231 – 236 respectively. The cam followers which are coupled with the actuators are supported on frame parts 228 mounted on top of the upper rotor frame arm 60A for the six arms of the rotor. Each of the hydraulic pumps or rams have suitable fluid connections 238 leading therefrom down the extent of the rotor arms to be connected to the actuators on each of the paddles as will be hereinafter defined.

Figure 7:
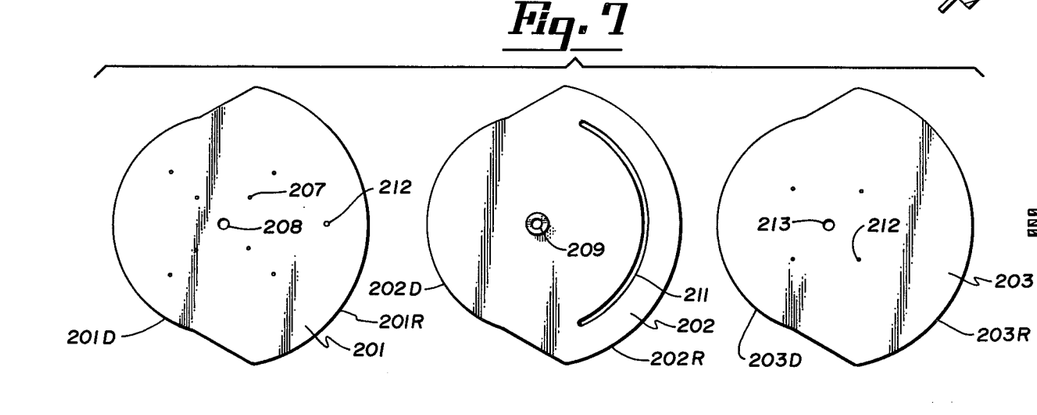
FIG. 7 is a plan view of the individual cams of FIG. 6.

As will be seen in FIG. 7, each of the cams 201 – 203 have the same shape with the dwell surface 201D, 202D, and 203D covering slightly less than 180° of the cam and with rise surfaces 201R, 202R, and 203R covering less than 180° of the cam surface. Sloped or inclined surfaces connect the rise and dwell portions of the same. As will be evident from FIGS. 3 and 5, the cam 201 which is the wind velocity cam, will be operated by a displacement of the vanes 160 sensing wind velocity whenever the wind magnitude is such as to displace the same against the associated counter weight 157 on the shaft supporting the vanes 160. This will cause the pulley 180 to rotate, rotating the shaft 190 thereon, which is secured to the hub 205 carrying the cam 201. Similarly, whenever the wind direction vane formed by the panel members 135 on rods 125 and counterbalanced by the weight 132 is displaced relative to the supporting structure 110, the shaft 128 will rotate within the shaft 190 and rotate the hub 215 carrying the cam 203 which is the wind direction cam. The hub 205 and hence the wind velocity cam 201 is also moved by the wind direction vane to align the wind velocity cam with the wind direction cam due to the facts that the velocity sensor is carried by the direction sensor. Only when the wind velocity exceeds the set level indicating a need to limit control speed of the rotor arms, does the shaft 190 move independent of the shaft 128 and relative thereto. It will also be seen in FIG. 5, that the hub 205 has a motor 240 associated thereto which motor is mounted on the connecting frame part 125 and has a pinion 241 which meshes with a gear surface 242 mounted on the upper peripheral surface of the hub associated with cam 201. This motor will be selectively energized and operated to rotate the cam 201 independent of the wind velocity panel and relative to the wind direction cam 203 for feathering or shutdown, as will be hereinafter defined. The idler cam 202, which is merely journaled on the shaft 128, freely floats and merely provides continuity of the camming surfaces whenever the motor 240 is energized and the cam 201 is moved to a position of disalignment with the cam 203 for shutdown purposes presenting a rise surface in all directions of rotation of the rotor relative to the composite cam surface. The pin 212 riding in the slot 211 of the freely floating idler cam 202 will cause it to rotate under such circumstances.

The cam followers 221–225 will follow the peripheral edges of the composite cam structure 200 from the rise to the dwell portions of the same with all conditions of rotation of the rotor arms which mount the cam followers. A suitable bias springs 245 positioned between the roller extremity and encircling the shaft bearing against the ram type pump urge the followers into engagement with the cam surfaces. Whenever the cam followers are riding on the dwell portion of the composite cam surface, the shaft will be extended and the ram plunger withdrawn so that fluid will be returned to the ram as will be later defined. As the rise surfaces are engaged by the cam followers, the shafts will be forced into the hydraulic ram type actuators providing a pumping action forcing fluid therein out through the couplings 238 thereon to the ram type actuators positioned on the paddles as will be hereinafter defined. As will be seen in FIG. 7, the orientation of the composite cam surface with respect to the cam followers on each of the arms will be such that the wind direction vane will move the cam surfaces so that the upwind arm will be riding on the declining cam surface from the rise portion of the surface to the dwell portion of the same. As the rotor arms are rotated, those arms with paddles moving downwind will have the cam followers riding on the dwell portion of the composite cam structure until the extreme downwind position is reached. At this portion, the cam followers will encounter the slope leading to the rise portion of the composite cam structure. Continued rotation of the arms past this point will present the high or rise portion of the cam surface to the associated cam followers on these arms as the arms move upwind toward the upwind position as established by the wind direction vane. In this half rotation of the rotor arms, fluid will be forced from the ram type pumps to the control motors mounted on the paddles associated with the end of the respective arms.

Figures 8, 9:
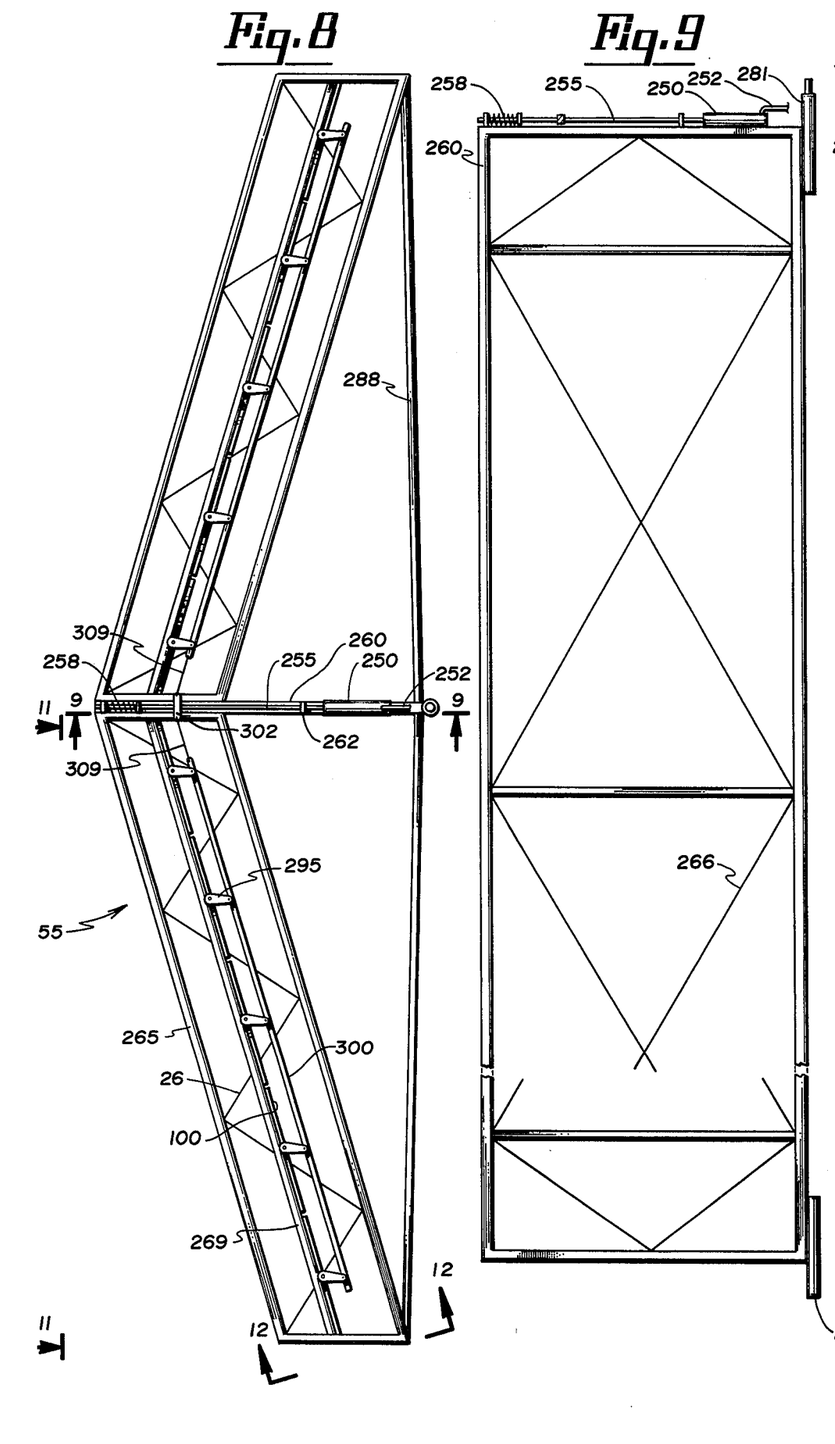
FIG. 8 is a top elevation view of a paddle for the vertical axle paddle motor.
FIG. 9 is a sectional view of the paddle frame section taken along the lines 9—9 in FIg. 8.
Figure 10:
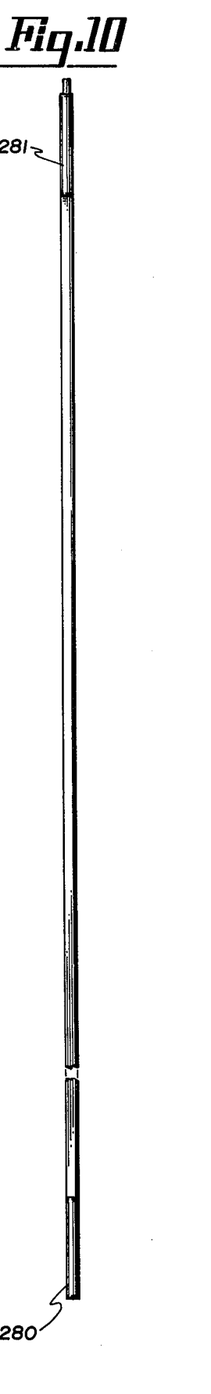
FIG. 10 is a right elevation view of the frame section of FIG. 9.
Figure 11:
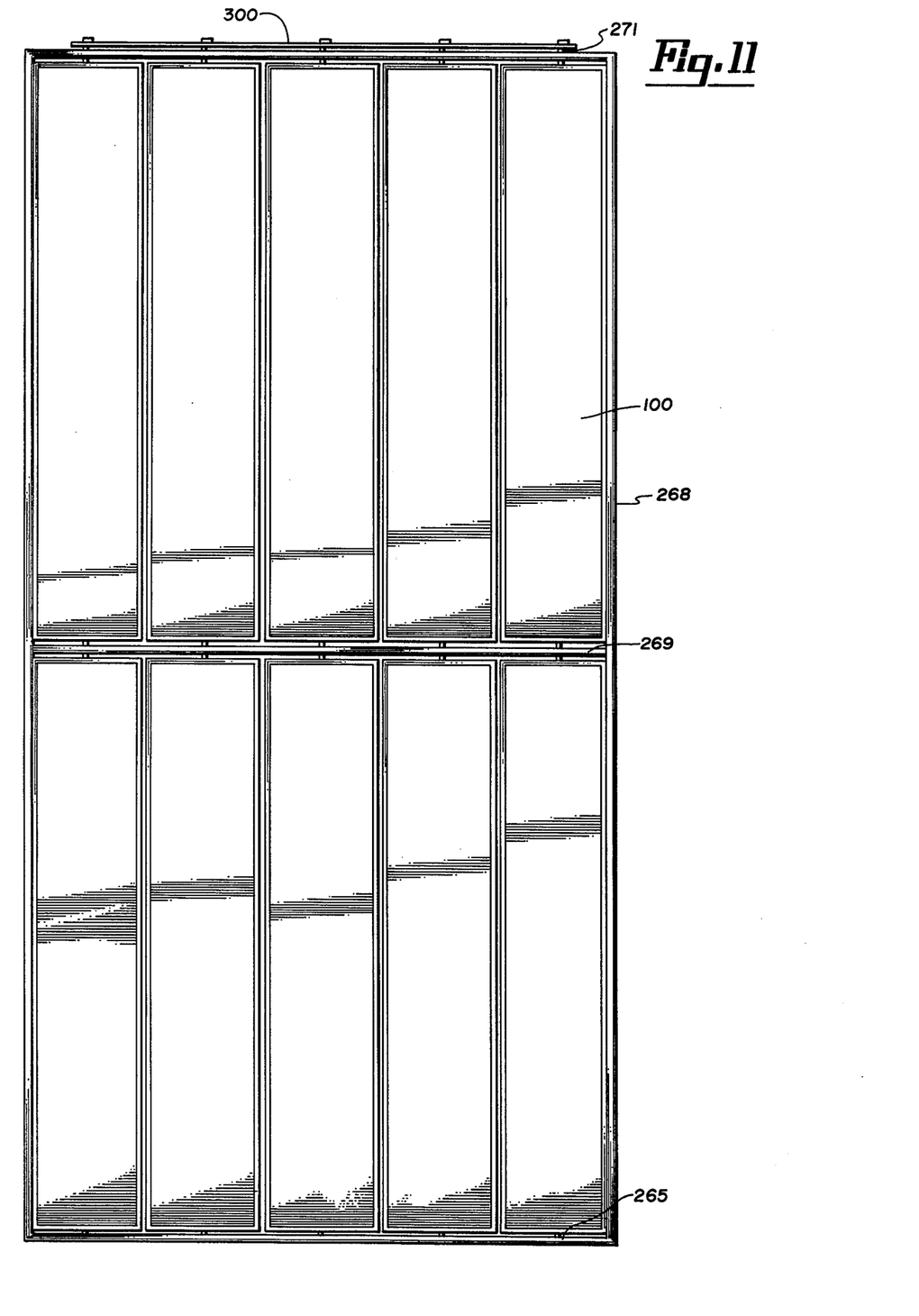
FIG. 11 is a sectional view of the paddle of FIG. 8 taken along the lines 11—11 therein.
Figures 12, 13, 14:
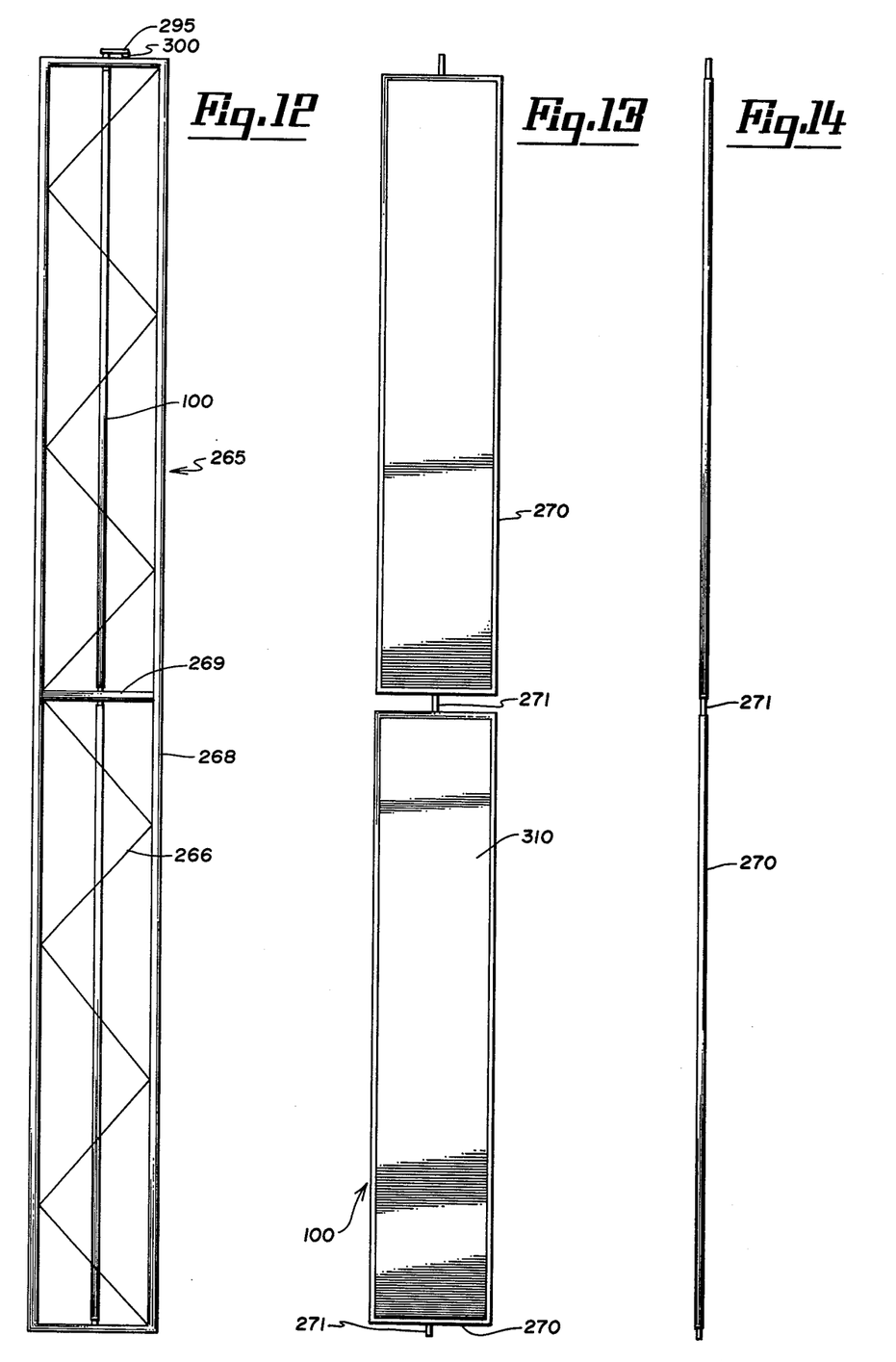
FIG. 12 is a sectional view of the paddle of FIG. 8 taken along the lines 12—12 therein.
FIG. 13 is an elevation view of an individual vane in the paddle.
FIG. 14 is an end elevation view of the vane of FIG. 13.

FIGS. 1 and 8 show the paddles 55 in elevation and plan views. FIGS. 9–14 showing the component parts of the same. Each paddle has associated therewith a ram type actuator 250 having an output shaft 255 guided on the top of the center panel 260 of the paddle through suitable guides 262. The actuator has a fluid coupling 252 at one end of the same which is adapted to be connected through a flexible pipe (not shown) to the fluid connection 238 of the associated pump. The pipe or flexible connection would normally extend along the top surface of the upper rotor frame arms 60A of the rotor frame for each arm and be connected to the ram type pumps 231–236 respectively for the various arms. Fluid from the rams 231–236 associated with the cam followers will be forced through the flexible pipes to the respective ram type actuators associated with each paddle for movement of the vanes therein as will be hereinafter identified. A suitable return spring 258 is associated with each shaft 255 to force the shaft back into the ram type actuator whenever fluid pressure is removed therefrom, forcing the fluid back through the flexible lines or pipes to the pump type actuators 231–236 in a self-contained fluid system.

Each of the paddles 55 are identical in construction and mount the plurality of vanes 100 therein to be pivoted from an open to a closed position. The paddles are mounted in box-like frame members 265 which appear in plan view as having a cross section similar to a parallelogram. The frames are constructed of metal tubing with interconnecting cross bracing 266, vertically extending bracing 268 and translationally extending bracing 269 to form the generally box-like structures. The centrally located bracing 269 mounts the individual vanes which are formed of rectangular frames 270 with a central shaft 271 extending therethrough and providing stub shafts at the end and middle of the two panels for longitudinal support as will be seen in FIGS. 13 and 14. A plurality of such panels are positioned in each box-like frame 265 as will be seen in FIG. 11 and two such frame members are interconnected with a central frame section 260 similarly formed of a metal tubing with cross bracing and mounting the journaling shafts 280, 281 at the ends of the same. At one end, the box-like members 265 are connected to the central frame section 260 and the opposite ends are rigidly secured or stabilized through tie bars or rods at the top or bottom of the same as indicated at 288. The hydraulic motor 250 and operating shaft 255 are positioned at the top of the center frame 260 and the pivot members mount in cooperating journals 290 on the upper and lower arm section 60a and 60b of the rotor arms to support the same and allow for pivotal movement of the paddles at the ends of the rotor arms. Each of the individual panels have the stub shaft portions 271 journaled in the respective frames on the top and bottom edges of the same and on the intermediate cross bracing and the top shaft has a arm 295 connected thereto for each shaft which arm is pivotally connected to a tie bar 300 so that all of the vanes in a box-like frame 265 will be pivoted simultaneously and through the same angle with movement of the tie bar. The tie bars of the two sections 265 forming the paddle are connected by suitable flexible tie rods 309 to a coupling or collar 302 on the shaft 255 of the actuator 250. Whenever the actuator 250 is extended, the tie bars will assume a position parallel to but spaced from the center frame parts and the vanes mounted thereon will provide a flushed surface on the interior of the box spring for a closed position of the paddle. Whenever the ram type actuator has its operating shaft 255 moved under the influence of the spring 256, toward or into the cylinder, the tie rods 309 will be moved with movement of the collar 302 to pivot the tie bars into close proximity with the brace supporting the upper pivots of the frame for pivoting all of the vanes on their respective pivots toward an open position. The degree of movement of the respective vanes, will be moved through an arc of 90° such that the vanes will be substantially aligned with the edges of the box-like frame in the open position and be parallel with the sides of the box-like frame in the closed position. Thus, whenever fluid is forced from the pump associated with the cam follower on the rotor arm, upon reaching of the rise portion of the cam structure, the fluid from the pump will force the ram-type actuator 250 to move the shaft out of confines of the associated cylinder and against the compression of the spring 256 allowing the vanes to go to a closed position within the supporting frame. When the dwell portion of the cam surfaces are reached, fluid will flow from the actuators 250 under the influence of the springs 256 forcing the fluid back into the ram-type pumps. This will move the vanes to the open or parallel position and feathered position. The box-like frames as noted above, are formed of tubing and cross bracing. The individual vanes while formed of tubing and bracing, includes a fiberglass covering 310 on each panel thereof to provide a solid surface against which the wind impinges to apply a force to the paddles in the rotation of the rotor. Also, as shown in FIG. 1, suitable pulley means 320 are mounted on the lower stub shaft of each paddle and diametrically opposed paddles or those mounted on diametrically opposed arms are interconnected by suitable cabling 325 so that movement of one paddle on one arm will be aligned with the similar movement of a correspondingly opposite paddle on a opposite rotor arm. This overcomes the effect of centrifugal force on the freely pivoted paddles on the end of the respective rotor arms as the rotor is rotated at a higher speed. As will be seen in FIGS. 2 and 8, the box-like frames are connected to the central support structure 260 of each paddle with the frames bearing in angular relationship to the tie bar 288 of approximately 15° giving a dished or concave surface to the paddles, particularly in the vane closed position, for maximum efficiency in transmitting wind force to rotor rotation. Similarly, this dished surface of the paddles will align the individual paddles into the direction of the wind as the rotor arms are rotated.

In the operation of the improved vertical axle paddle motor, the wind direction vane controls the positioning of the cams which operates to open and close the vanes as the rotor arms rotate in the upwind and downwind direction. The wind direction vane operates the position both of the control cams 201 and 203 representing wind velocity and wind direction, such that the low points of the cams will be oriented with the downwind direction of rotor arm movement, causing the vanes in each of the paddles associated with the arms moving through this area to be closed. As will be seen in FIG. 4, the orientation of the dwell portion of the cam is generally aligned with the wind direction vane and for normal rotation covers approximately 180° of travel of the rotor arms in the downwind direction causing cam followers to move to a position wherein fluid will be moved from the paddle motors to the pumps allowing the tie bars 300 to move the vanes to the closed position. Similarly, in the upwind direction of rotor rotation, the cam orientation is such that the cam followers will engage the rise surface of the cams, moving the respective actuators on the paddles to an extended position and forcing the vanes through the tie bars to an open or feathered position. As the rotor reaches a desired level of speed, this action will continue. Whenever the wind velocity increases above a predetermined level set by the wind velocity sensor, independent rotation of the wind velocity cam takes place to increase the size of the rise surface on the composite cam structure. Thus, the cam 201 will move out of alignment with the cam 203 increasing the composite rise surface. The rotor arms under such conditions when reaching the upwind position will no longer be moved to a closed vane position but will be held open a longer period of time entering into the area of downwind travel of the rotor arms in proportion to the amount of disalignment of the rotor cams. This in effect reduces the amount of surface area against which the wind blows on the paddles and hence, reduces the speed or rotation of the same. Proportional increases of speed above the desired level increases the disalignment between cams and decreases the amount of time the vanes are closed on the downwind stroke.

Whenever it is desired to shut down the paddle motor, the motor 240 is energized rotating the wind direction cam 201 through the hub 203 to a position to which the rise surface is totally disaligned with the rise surface on the cam 203. With such movement, the idler cam will also be moved to present a composite cam surface which has no dwell portion thereon, thereby, preventing any of the paddles from moving to a closed position. This will in effect stop the rotor arms from rotation. Energization of the motor in the opposite direction will reverse the position of the wind velocity cam to a position of alignment with the wind direction cam. The wind direction will orient the wind direction cam through its vane to a position of maximum efficiency in transmitting wind force to rotational force on the rotor axle.

Although not specifically shown, it will be understood that the rotation of the rotor axle may be transmitted to any type of motive means for performing work in accord with the power rotation of the rotor axle. In FIG. 1, the rotor axle is coupled to generating equipment to produce electrical energy with axle rotation.

Therefore, in considering this invention it should be remembered that the present disclosure is illustrative only and the scope of the invention should be determined by the appended claims.

I claim:

1. A vertical axis paddle motor comprising, an upstanding frame, a vertical axle supported by said frame, a rotor frame having a plurality of rotor arms journaled on said vertical axle for rotation on said axle and within said upstanding frame, a paddle pivotally mounted on the end of each rotor arm, each of said paddles being formed of a plurality of vanes pivotally mounted in a paddle frame and linked together to pivot from an open to a closed position with the frame, motor means mounted on each paddle to move the vanes therein from the open to the closed position, a wind direction indicator vane pivotally mounted on the top of the upstanding frame and coupled to a first shaft, a wind velocity sensor carried by the wind direction indicator and coupled to a second shaft, composite cam means mounted on the first and second shaft and separately adjustable upon rotation of said shafts, cam follower means mounted on each rotor arm and engaging the composite cam means, means connecting the cam follower means to the motor means mounted on the paddle for each arm to control the operation of the motor means in the opening and closing of the vanes, and means connected to the vertical axle and driven thereby.

2. The vertical axle paddle motor of claim 1 in which the composite cam means is a pair of cam members separately journaled on said rotor frame and connected to the first and second shafts respectively for adjustment relative to one another to present a composite cam surface to the cam followers on the rotor arms.

3. The vertical axle paddle motor of claim 2 in which the first and second cam members are positioned in a stacked and adjacent relationship.

4. The vertical axle paddle motor of claim 3 and including an idler cam positioned between the first and second cam members and coupled to the first cam through a pin and slot connection to provide continuity between the surfaces of the first and second cam members to the cam follower means.

5. The vertical axle paddle motor of claim 2 in which the cam follower means includes a hydraulic pump and the motor means on the paddle of each cam arm is a reversible hydraulic motor coupled to the pump.

6. The vertical axle paddle motor of claim 5 in which the hydraulic pump is a ram type actuator operated by movement of the cam follower.

7. The vertical axle paddle motor of claim 6 in which each hydraulic pump and hydraulic motor form a separate hydraulic system operated by the cam followers to change vane positions in the respective paddles.

8. The vertical axle paddle motor of claim 7 in which the vanes in each paddle are connected through a common linkage and bell crank at each paddle to the motor means for simultaneous movement of the vanes in each paddle.

9. The vertical axle paddle motor of claim 2 and including separate motor and gear means mounted on the rotor frame and connected to the cam member mounted on the second shaft and responsive to wind velocity being operative to rotate said cam member to position all of the vanes to an open position to cause rotation of the rotor frame on the vertical axle to stop.

10. The vertical axle paddle motor of claim 1 in which the wind direction indicator is a pivoted vane mounted on the upstanding frame and connected to said first shaft journaled therein, and in which the wind velocity sensor is a second pivoted vane mounted on the first vane and normal to the longitudinal extent of the first vane with means coupling said second pivoted vane to the second shaft journaled in part in said upstanding frame.

11. The vertical axle paddle motor of claim 10 in which the second pivoted vane forming the wind velocity sensor includes an adjustable counter balance mechanism coupled to the second pivoted vane.

12. The vertical axle paddle motor of claim 11 in which the coupling of the second pivoted vane forming the wind velocity sensor to the second shaft includes pulley means mounted on the pivot of the second vane and coupled through pulley means to a pulley on the second shaft by a cable.

13. The vertical axle paddle motor of claim 10 in which the first and second shafts of the wind direction and wind velocity sensors respectively are coaxial with the first shaft journaled in a tubular member defining the second shaft which is journaled in the upstanding frame.

14. The vertical axle paddle motor of claim 13 in which the pivoted vane of the wind direction sensor is an elongated frame formed of interconnected parallel members mounting a plate-like member on each of the parallel members near one end of the parallel members and with the counter balance weight positioned on the opposite end of the parallel members and including hub means connected between the parallel members and mounting the first shaft.

15. The vertical axle paddle motor of claim 14 in which the second pivoted vane defining the wind velocity sensor includes a pivoted shaft mounted on the elongated members of the pivoted vane of the wind direction sensor which shaft mounts a pulley wheel positioned between the plate-like members and with the shaft extending transversely of the plate-like members and mounting a pair of translationally extending paddle members normal to the extent of the elongated members defining the second pivoted vane with a cable positioned over a pulley wheel on the pivot shaft and connected to a pulley wheel on the second shaft to transmit rotation of the second pivoted vane.

16. The vertical axle paddle motor of claim 15 in which the first and second shafts are journaled in part in the upstanding frame and in part on the rotor frame with the vertical axle being journaled to the upstanding frame through a journaled coupling connected to the first and second shafts.

17. The vertical axle paddle motor of claim 16 in which the pivoted vanes of the wind direction sensor and wind velocity sensor are formed of metal frame parts covered with a fiberglass sheet.

18. The vertical axle paddle motor of claim 1 in which the vanes of the paddles are defined by metal frames covered with a fiberglass covering.

19. The vertical axle paddle motor of claim 18 in which the frames of the paddle are metal box-like frame members in which the individual vanes are pivotally mounted within the box-like frame members.

20. The vertical axle paddle motor of claim 19 in which the frames of the paddle motors include two sections which bear an angular relationship to one another along their extent of approximately 15°.

21. The vertical axle paddle motor of claim 1 and including means interconnecting diametrically opposed paddles on the rotor arms through their pivots to compensate for the effect of centrifugal force on the paddles.

22. The vertical axle paddle motor of claim 21 in which the means interconnecting diametrically opposed paddles on the rotor arms include pulley means mounted on the shaft supporting the individual paddles on the rotor arms and interconnecting diametrically opposed paddles on the rotor arms through cable means.

23. The vertical axle paddle motor of claim 7 in which the hydraulic motor means mounted on each paddle frame includes spring bias means biasing the motor means in one of two operating positions.

* * * * *